April 14, 1970   J. A. BELL ET AL   3,506,173
FILM TRANSPORT MECHANISM
Filed May 27, 1968   2 Sheets-Sheet 1

INVENTORS
J. A. Bell et al
By Glascock, Downing &
Seubold
ATTORNEYS

United States Patent Office 3,506,173
Patented Apr. 14, 1970

3,506,173
FILM TRANSPORT MECHANISM
John Albert Bell, Hazlemere 11, Perlercroft Road, Ashurst, England, and Geoffrey Harrison Galley, 7 St. Pauls Road, Sarisbury Green, Southampton, England
Filed May 27, 1968, Ser. No. 732,809
Int. Cl. B65h 17/04
U.S. Cl. 226—49                                   4 Claims

ABSTRACT OF THE DISCLOSURE

A drive for a film moving sprocket to which is connected a drum with a continuous uninterrupted inner surface and an outer surface formed with angularly spaced grooves, there being a friction driving wheel within the drum and a pinch wheel contiguous with the drum exterior, these wheels being linked so that the driving wheel can contact the drum interior to drive it and this drive will continue until the pinch wheel enters one of the grooves.

---

This invention relates to a film transport mechanism which, for example, may be used in teaching machines or the like. In the present specification and claims the term "film" is used to include, inter alia, paper, tape and other flexible strip material carrying data.

An object of the invention is to provide an improved transport mechanism which is of a simple and reliable construction.

According to the invention, a film transport mechanism comprises a rotatable drum open at one end coupled to a drive sprocket for moving the film, said drum having adjacent one surface thereof a friction driving wheel mounted about an axis parallel to the drum axis of rotation and arranged so that by movement of a lever assembly the friction wheel is brought into driving engagement with the drum, said lever assembly also carrying a pinch wheel which rides on another surface of the drum and maintains engagement between the drum and the friction wheel until the pinch wheel drops into a marker groove on said other surface of the drum. The marker grooves are arranged at intervals round the drum corresponding to the film being advanced a given distance, such as one frame. The drum may be cylindrical or conical.

Figure 1:
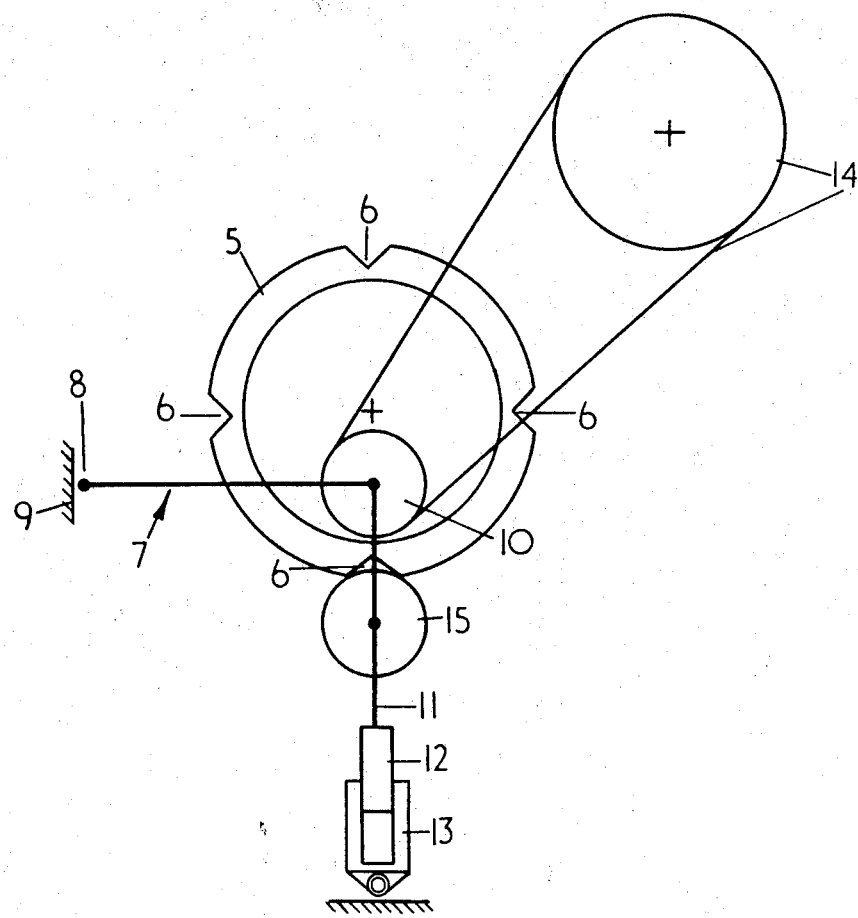
Figure 2:
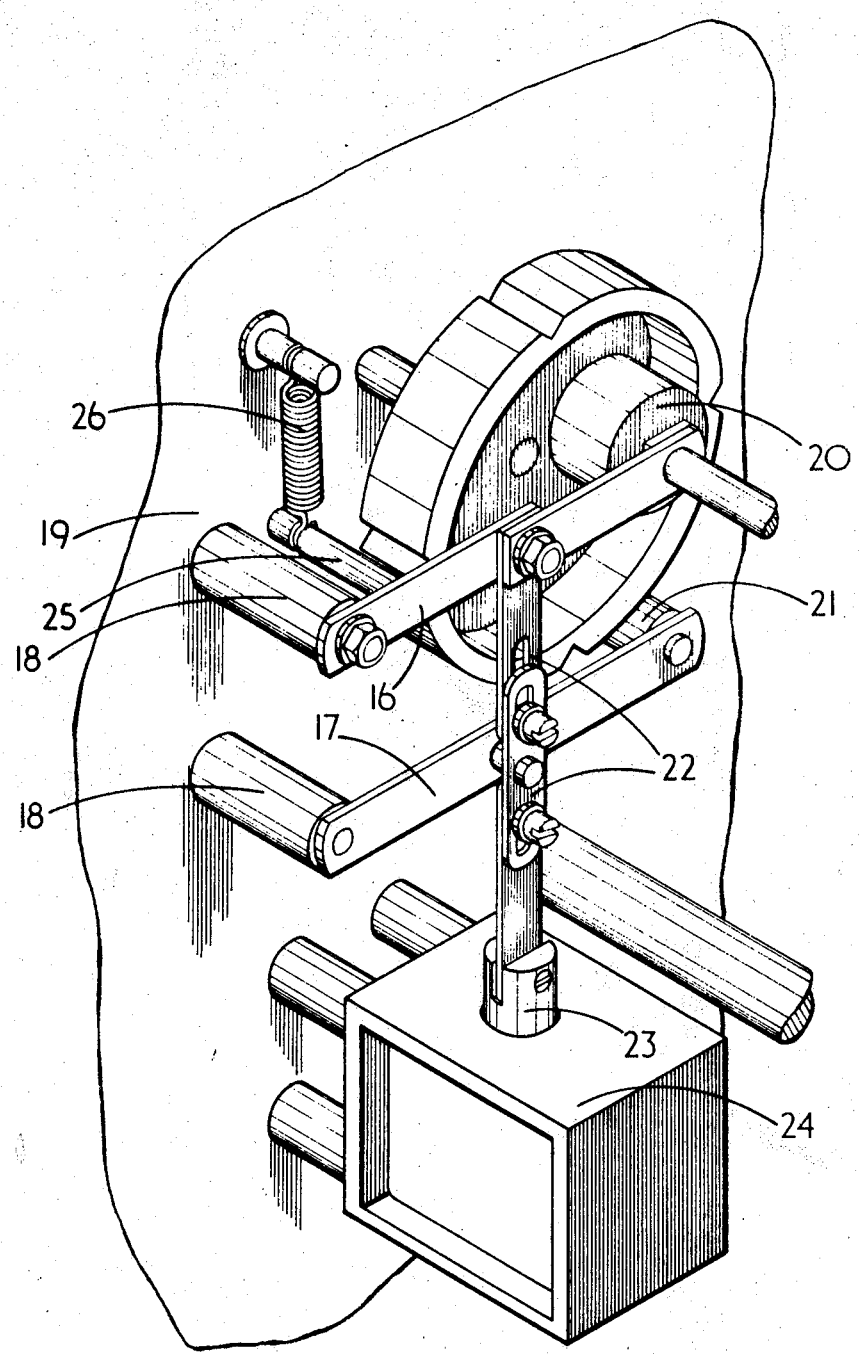

An embodiment of the present invention will now be described, by way of example, with reference to the accompanying drawings, in which:

FIG. 1 is a diagrammatic view of a film transport mechanism in accordance with the present invention; and FIG. 2 is a perspective diagrammatic view of a modified mechanism.

Referring to FIG. 1 of the drawings, the transport mechanism comprises a rotatable cylindrical drum 5 open at one end. The outer surface of the cylindrical wall of the drum 5 is provided with a number of grooves 6 running parallel to the axis of rotation and at right angles to the radius of the drum 5. The purpose of the grooves 6 will be apparent from the description as it proceeds.

Adjacent the drum 5 there is a link 7 which at one end 8 is pivotally mounted to the frame 9 of the mechanism and the other end supports a friction drive wheel 10 which in the normal position of the link 7 is just out of contact with the inner surface of the drum 5 as shown. A link 11 is secured to the link 7 at the axis of the friction wheel 10 and at its other end is connected to an armature 12 of a solenoid 13, the arrangement being such that when the solenoid 13 is energised the linkage 7 and 11 is moved so that the friction wheel 10 is brought into engagement with the inner surface of the drum 5. The friction wheel 10 is carried on a shaft which is driven through a pulley drive 14 from a conventional motor (not shown) mounted on the frame of the mechanism. The linkage 7 and 11 also carries a pinch wheel 15 mounted on the link 11 and which bears on the outer surface of the drum 5 and in so doing prevents the friction wheel 10 from being released from engagement with the drum 5 so that the drive to the drum 5 is maintained until the pinch wheel 15 comes to one of the grooves 6 whereupon it drops in and enables the friction wheel 10 to disengage from the drum 5. Thus when the solenoid 13 is operated the linkage 7 and 11 is moved so that drive is imparted to the drum 5 by the friction wheel 10. The drive is continued by virtue of the action of the pinch wheel 15 until it encounters a groove 6. This design facilitates the automatic framing of the filmstrip material since the friction wheel 10 cannot be released until a groove 6 is encountered by the pinch wheel 15. The activation of the solenoid 13 for an extremely short period of time causes engagement of the friction wheel 10 which is locked in the drive position by the pinch wheel 15 and linkage 7 and 11 until a groove 6 is encountered and hence a pulse of short and possibly variable duration has the effect of transferring the same length of film which is fixed by appropriate positioning of the grooves 6 on the drum 5.

The system described is capable of motion in a forward or reverse direction, either of which being selected by activation of a changeover relay or switch (not shown) in known manner. The activation of this relay or switch may be controlled by a photo electric circuit which derives its information from the filmstrip being transported through the mechanism. In this way the film may be programmed so as to control the orientation of motion of the film independently of the operator of the mechanism.

The transport mechanism above described may with advantage be used in conjunction with a cassette as described in our co-pending patent application No. 48,782/65 filed in Great Britain.

By appropriate arrangement the sprocket wheel (not shown) of the transport mechanism is caused to engage that portion of the film which appears in the extended slide of the cassette assembly. Rotation of the sprocket wheel causes transfer of the film between the cassette and a suitably placed receiving chamber on the side of the sprocket wheel remote from the cassette.

The solenoid of the transport mechanism may conveniently be controlled by a telephone dial which provides the impulses to the solenoid, the time taken by the transport mechanism to move the filmstrip one frame being less than the interval between the impulses emanating from the telephone type dial.

When it is desired to rewind the filmstrip continuous movement of the film is obtained by maintaining the solenoid 13 energised so that the pinch wheel 15 is prevented from dropping into a groove 6 in the drum 5.

In a modification (FIG. 2) the linkage comprises a pair of parallel links 16 and 17, each pivoted as indicated at 18 at one end to the frame 19 of the mechanism with the upper link 16 having at its other end the frictional wheel 20 and the lower link 17 having at its other end the pinch wheel 21. A third and vertical link 22 interconnects the parallel links 16 and 17 intermediate their ends and is connected at its lower end to the armature 23 of the solenoid 24. The upper link 16 has extending laterally thereof from a position intermediate its ends a link or rod 25 connected to the frame 19 by a spring 26 tending to urge the parallel linkage 16 and 17 and consequently the friction wheel 20 to a position in which drive is not imparted to the drum.

The operation of the FIG. 2 embodiment is the same as that described with reference to FIG. 1.

What is claimed is:

1. A film transport mechanism comprising a rotatable drum open at one end coupled to a drive sprocket for moving the film, said drum having adjacent one surface thereof a friction driving wheel mounted about an axis parallel to the drum axis of rotation and arranged so that by movement of a lever assembly the friction wheel is brought into driving engagement with the drum, said lever assembly also carrying a pinch wheel which rides on another surface of the drum and maintains engagement between the drum and the friction wheel until the pinch wheel drops into a marker groove on said other surface of the drum.

2. A mechanism as claimed in claim 1, in which the marker grooves are arranged at intervals round the drum corresponding to the film being advanced a given distance, such as one frame.

3. A mechanism as claimed in claim 1, in which the lever assembly is movable under the action of pulses from a solenoid, the armature of which is connected to the lever assembly.

4. A mechanism as claimed in claim 1, in which the drum is capable of motion in a forward or reverse direction.

References Cited

UNITED STATES PATENTS

| | | | |
|---|---|---|---|
| 3,352,468 | 11/1967 | Shoemaker | 226—134 X |
| 3,392,895 | 7/1968 | Ellner | 226—152 X |

RICHARD A. SCHACHER, Primary Examiner

U.S. Cl. X.R.

352—187; 226—134, 152